United States Patent [19]

Miller

[11] 4,148,175
[45] Apr. 10, 1979

[54] CORN STALK HARVESTER AND WINDROW ATTACHMENT FOR A CORN PICKER HEADER

[76] Inventor: Kent A. Miller, R.R. 1, Brandon, Iowa 52210

[21] Appl. No.: 783,707

[22] Filed: Apr. 1, 1977

[51] Int. Cl.² ............................................. A01D 45/02
[52] U.S. Cl. ...................................... 56/14.4; 56/13.7; 56/14.5; 56/97; 56/192
[58] Field of Search ................... 56/99, 98, 192, 13.7, 56/13.8, 14.3, 158, 2, 14.4, 14.5, 14.1, 14.2, 97, 66

[56] References Cited

U.S. PATENT DOCUMENTS

| | | | |
|---|---|---|---|
| 1,905,410 | 4/1933 | Innes | 56/13.8 |
| 2,760,326 | 8/1956 | Smith | 56/192 |
| 3,601,957 | 8/1971 | Duncan | 56/13.8 |
| 4,009,557 | 3/1977 | Reicks | 56/98 |

*Primary Examiner*—Jay N. Eskovitz
*Attorney, Agent, or Firm*—Zarley, McKee, Thomte, Voorhees & Sease

[57] ABSTRACT

A self-propelled combine includes a corn picker head having a corn stalk harvesting and windrow attachment on its underside which includes gathering guide fingers for each row of feeding stalks into a sickle cutter and paddle reel forwardly of augers which convey cut stalks to a centrally positioned discharge, whereby the stalks are dropped onto the ground in a windrow.

8 Claims, 8 Drawing Figures

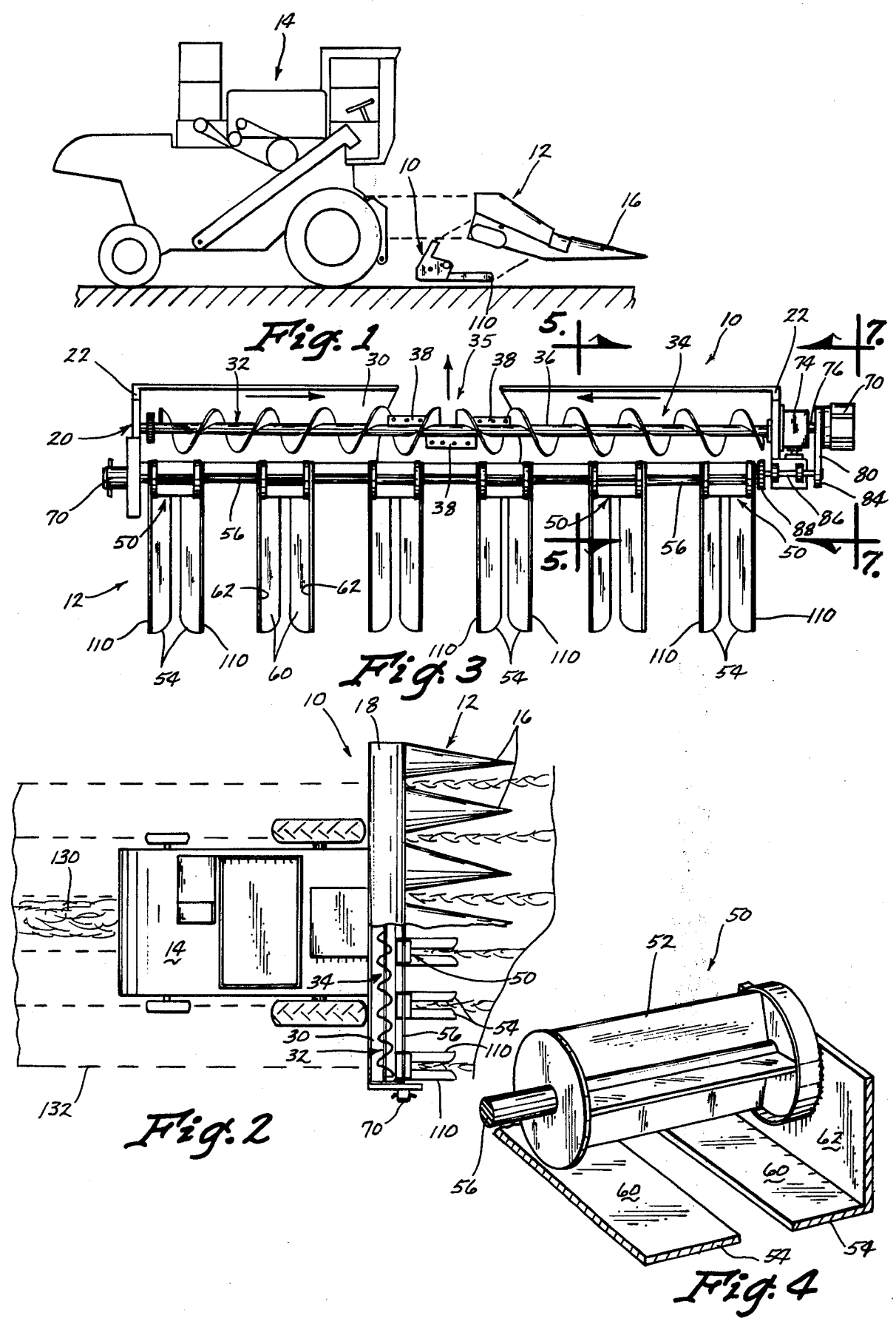

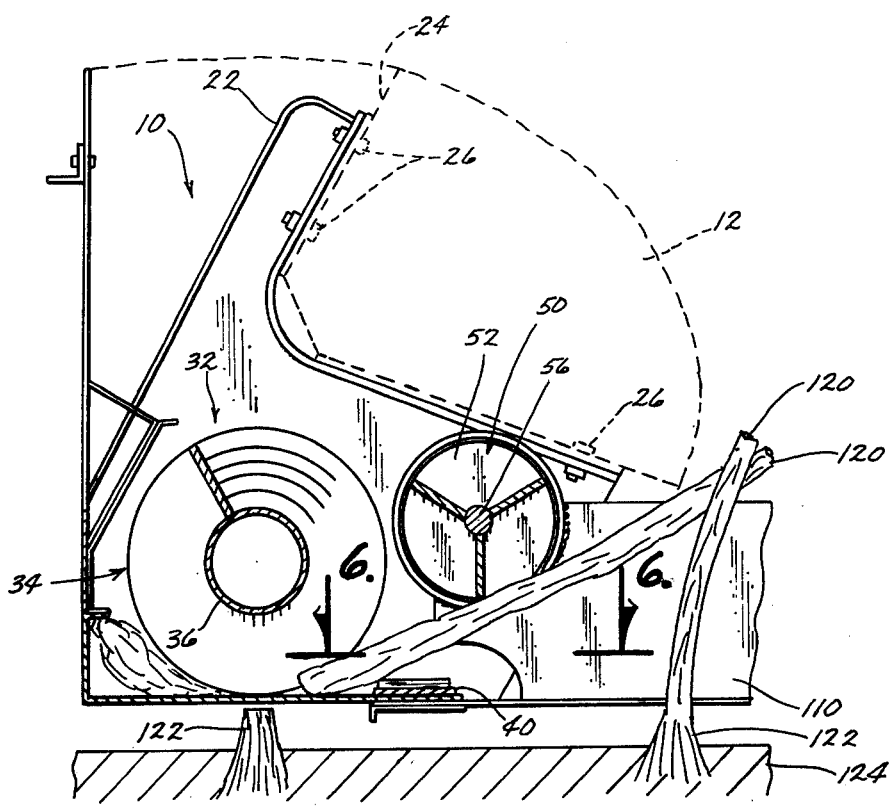
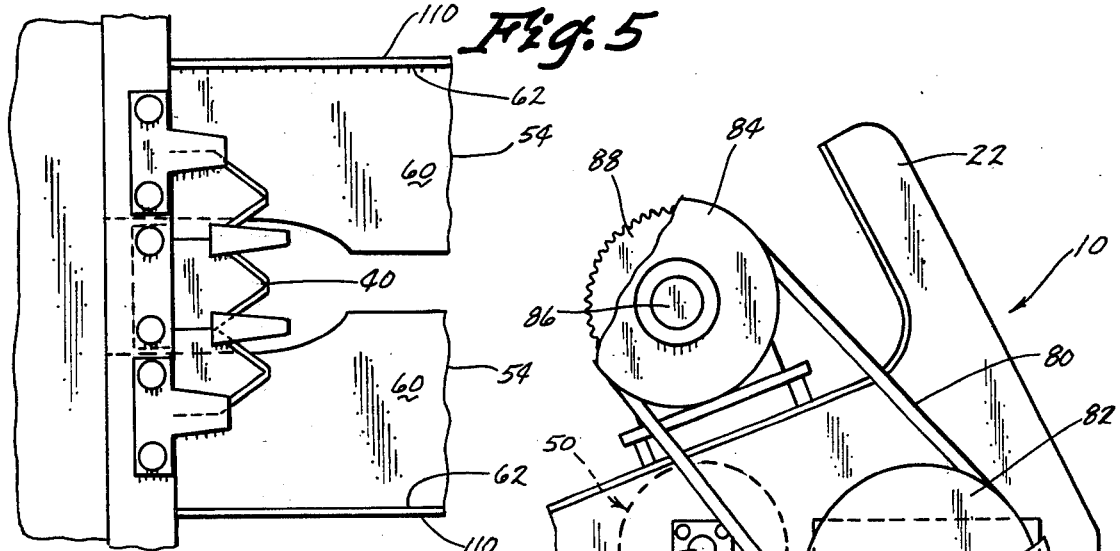
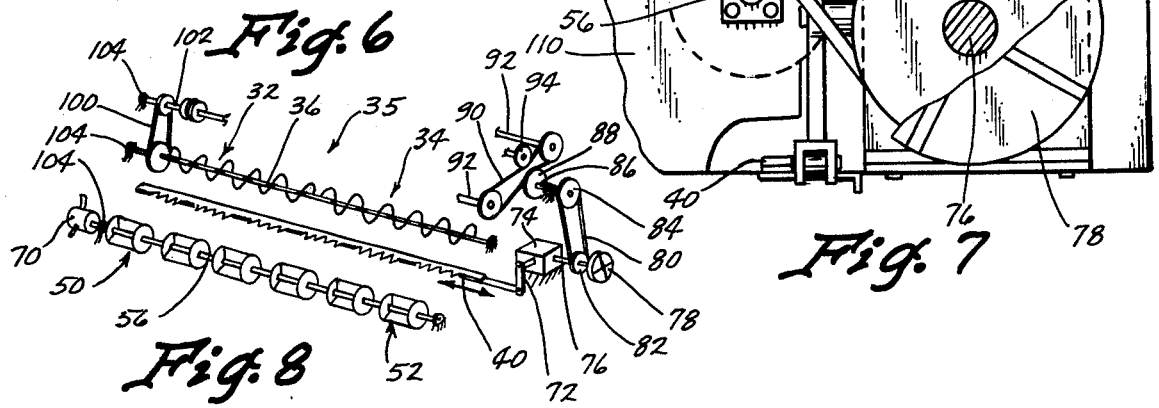

CORN STALK HARVESTER AND WINDROW ATTACHMENT FOR A CORN PICKER HEADER

BACKGROUND OF THE INVENTION

This invention relates to combining of the ear of corn as well as the windrowing of the corn stalks. Conventionally corn pickers remove the ears from the stalks and process those ears on through the machine, while leaving the stalks flattened against the ground while still secured to their root structure. The stalks left in this condition are difficult to pick up and utilize for corn fodder or silage. It is thus desirable that a machine be provided that will not only remove the ears of corn from the stalks but cut the stalks and put them into a windrow whereupon they can be easily picked up and utilized as desired, such as by being processed through a chopping machine.

SUMMARY OF THE INVENTION

In accordance with the present invention, the conventional combine having a corn picker header is utilized by adding to it on the lower side an attachment which will cut and windrow the corn stalks as the ears of corn are being removed in a conventional manner. The attachment is secured to the frame of the header by finger mounting brackets at opposite ends of the attachment positioned on the back side of the header and by forwardly extending gathering guide fingers being connected to the header gathering shoes thereabove. The attachment includes a sickle bar and paddle reel ahead of oppositely extending augers which feed cut stalks to the center of the attachment for discharge as a windrow along the center line and beneath the combine. The paddle reel is driven by the hydraulic motor normally used for the combine reel, while the sickle bar and augers are driven by the snapping roller drive shafts and operate in timed relationship therewith.

DESCRIPTION OF THE DRAWINGS

FIG. 1 is an exploded side elevation view of a self-propelled harvesting vehicle having a corn picker head with the attachment of this invention positioned therebeneath.

FIG. 2 is a top plan view thereof with the corn picker head and windrow attachment in operating position.

FIG. 3 is a top plan view of the windrow attachment only.

FIG. 4 is a fragmentary perspective view of a paddle reel and gathering guide fingers for one corn row.

FIG. 5 is a cross-sectional view taken along line 5—5 of FIG. 3.

FIG. 6 is a cross-sectional view taken along line 6—6 of FIG. 5.

FIG. 7 is an elevational view taken along line 7—7 of FIG. 3.

FIG. 8 is a diagrammatic representation of the driving system for operating the paddle reel, sickle bar and auger.

DESCRIPTION OF THE PREFERRED EMBODIMENT

The harvesting and windrow attachment of this invention is referred to generally in FIG. 1 by the reference numeral 10 and is shown positioned below a corn picker header 12 carried by a self-propelled combine harvesting vehicle 14. The corn picker header includes gathering shoes 16, and a frame 18.

The windrow attachment 10 includes a frame 20 having upstanding mounting finger brackets 22 at the opposite rear corners for connection to the rear lower side 24 of the header 12 as seen in FIG. 5. The connection is made by two mounting bolts for each of the mounting finger brackets 22 and a third bolt 26 which connects adjacent horizontal end surfaces of the header 12 and the attachment 10.

The rear of the attachment 10 includes a conveying trough or pan 30 in which oppositely disposed inwardly conveying solid flighting auger portions 32 and 34 are positioned to convey material to a centrally located discharge opening 35. The auger portions 32 and 34 are on a common auger shaft 36 having paddle portions 38 at the center discharge opening 35.

Forwardly of the auger portions 32 and 34 is a sickle bar 40 and thereabove is a reel 50 having a plurality of paddle units 52 for each corn row. A pair of gathering guide fingers 54 is provided for each corn directly forward of each paddle unit 52. Reel 50 includes a shaft 56 on which each of the paddle units 52 is mounted. Each of the gathering guide fingers 54 include horizontal and vertical legs 60 and 62 respectively.

In FIG. 8 the power system for driving the reel 50, sickle 40 and augers 32 and 34 is shown. The reel shaft 56 is driven by a hydraulic motor 70 which is utilized for driving the combine reel when the attachment 10 has been removed and the grain harvesting header is in place of the corn header 12. The sickle 40 is connected to a pittman 72 in turn connected by a gear box 74 having an input shaft 76 on which a clutch 78 is provided for engaging and disengaging a belt 80 extending between a pulley 82 on the shaft 76 and a pulley 84 on the snapping roller drive shaft 86. The drive shaft 86 includes a sprocket 88 in engagement with an endless chain 90 connected to conventional snapping roller shafts 92. A chain tightener sprocket 94 is also provided.

The augers 32 and 34 on the common shaft 36 are driven by a chain 100 connected to a snapping roller drive shaft 102. The shafts 36 and 102 are mounted in bearings 104.

Thus, it is seen in operation that the attachment 10 may be quickly attached or removed from the corn picker header 12 by operation of the mounting bolts 26 as seen in FIG. 5, and also the single mounting bolts 110 on each gathering finger 54 at its forward end. The power is supplied from existing power sources on the corn picker header, including the snapping roller shafts at opposite ends of the corn picker header, and through further utilization of the hydraulic motor 70 for the combine reel (not shown). The stalks 120 having roots 122 in the ground 124 are guided between the gathering fingers 54 and are fed under the individual paddle units 52 into engagement with the cutter bar 40 wherein the stalks 120 are severed from their roots 122 and then fed into the augers 32 and 34 whereupon they are conveyed to the center discharge opening 34 for discharge onto the ground as a windrow 130 as seen in FIG. 2 at the center line of the self-propelled harvester vehicle 14. The machine illustrated will harvest ear corn and windrow stalks from six rows 132 as seen in FIG. 2. The windrow 130 may now be utilized in a conventional manner such as by being picked up by a corn stalk chopper and processed for silage or the like.

What is claimed is:

1. In combination a corn picker header and corn stalk harvesting and windrow attachment comprising, a corn picker header having an elongated header frame, a corn stalk harvesting and windrow attachment positioned under said header and having an attachment frame connected to said header frame, conveyor means extending the substantial length of said attachment frame for conveying corn stalks to a discharge means, and a stalk cutting means positioned ahead of said conveyor means and extending the substantial length of said attachment frame for cutting stalks to be received by said conveyor means whereby they are conveyed to said discharge means and discharged rearwardly as a windrow.

2. In combination a corn picker header and corn stalk harvesting and windrow attachment comprising, a corn picker header having an elongated header frame, a corn stalk harvesting and windrow attachment positioned under said header and having an attachment frame connected to said header frame, conveyor means extending the substantial length of said attachment frame for conveying inwardly from opposite ends to a centrally positioned discharge means, and a stalk cutting means positioned ahead of said conveyor means and extending the substantial length of said attachment frame for cutting stalks to be received by said conveyor means whereby they are conveyed to said centrally positioned discharge means and discharged rearwardly as a windrow.

3. The structure of claim 2 wherein a powered reel extends the substantial length of said attachment frame and includes paddle means for each corn row to feed stalks into said cutting means and conveyor means.

4. The structure of claim 2 wherein forwardly extending gathering guide fingers are provided ahead of said cutting means for each corn row to guide stalks into said cutting means.

5. The structure of claim 2 wherein said conveyor means is further defined as an auger having opposite screw portions for feeding stalks to said centrally positioned discharge means.

6. The structure of claim 2 wherein said cutting means is further defined as being a sickle cutter.

7. In combination a corn picker header and corn stalk harvesting and windrow attachment comprising, a corn picker header having an elongated header frame, a corn stalk harvesting and windrow attachment positioned under said header and having an attachment frame connected to said header frame, an auger having opposite screw portions extending the substantial length of said frame for feeding stalks to a centrally positioned discharge means, a sickle cutter positioned ahead of said auger and extending the substantial length of said frame for cutting stalks to be received by said auger, a powered reel extending the substantial length of said frame and includes paddle means for each corn row to feed stalks into said sickle and auger, and forwardly extending gathering guide fingers positioned ahead of said sickle for each corn row to guide corn stalks into said reel and sickle whereby the stalks are received by said auger and fed to said discharge means and discharged in a windrow.

8. The structure of claim 2 wherein said corn picker header includes snapping roller drive means and said conveying means and cutting means are connected thereto to be driven in timed relationship therewith.

* * * * *